United States Patent
Boguraev et al.

(10) Patent No.: US 9,020,805 B2
(45) Date of Patent: Apr. 28, 2015

(54) CONTEXT-BASED DISAMBIGUATION OF ACRONYMS AND ABBREVIATIONS

(75) Inventors: Branimir K. Boguraev, Bedford, NY (US); Jennifer Chu-Carroll, Dobbs Ferry, NY (US); David A. Ferrucci, Yorktown Heights, NY (US); Anthony T. Levas, Yorktown Heights, NY (US); John M. Prager, Pomona, NY (US)

(73) Assignee: International Business Machines Corporation, Armonk, NY (US)

(*) Notice: Subject to any disclaimer, the term of this patent is extended or adjusted under 35 U.S.C. 154(b) by 344 days.

(21) Appl. No.: 13/243,864

(22) Filed: Sep. 23, 2011

(65) Prior Publication Data

US 2012/0084076 A1     Apr. 5, 2012

Related U.S. Application Data

(60) Provisional application No. 61/387,562, filed on Sep. 29, 2010.

(51) Int. Cl.
  *G06F 17/27* (2006.01)
  *G10L 15/22* (2006.01)
  *G06F 17/30* (2006.01)

(52) U.S. Cl.
  CPC .............. *G06F 17/276* (2013.01); *G10L 15/22* (2013.01); *G06F 17/30864* (2013.01); *G06F 17/2735* (2013.01)

(58) Field of Classification Search
  CPC ................... G06F 17/30864; G06F 17/30637; G06F 17/276; G06F 17/2735; G10L 15/22
  USPC ............................................................. 704/9
  See application file for complete search history.

(56) References Cited

U.S. PATENT DOCUMENTS

| | | | |
|---|---|---|---|
| 5,634,051 A | 5/1997 | Thomson | |
| 5,634,084 A * | 5/1997 | Malsheen et al. | 704/260 |
| 5,794,050 A | 8/1998 | Dahlgren et al. | |
| 7,092,928 B1 | 8/2006 | Elad et al. | |
| 7,136,876 B1 * | 11/2006 | Adar et al. | 1/1 |
| 7,181,438 B1 | 2/2007 | Szabo | |
| 7,558,778 B2 | 7/2009 | Carus et al. | |

(Continued)

OTHER PUBLICATIONS

Chaudhuri, "Mining Document Collections to Facilitate Accurate Approximate Entity Matching", VLDB '09, Aug. 2428, 2009, Lyon, France.*

(Continued)

*Primary Examiner* — Jialong He
(74) *Attorney, Agent, or Firm* — Scully, Scott, Murphy & Presser, P.C.

(57) ABSTRACT

Context-based disambiguation of acronyms and/or abbreviations may determine a target abbreviation and one or more keywords appearing in context with the target abbreviation in a received passage, the target abbreviation representing a shortened form of one or more word. A contextual search query including the target abbreviation and said one or more keywords may be generated. A pseudo document index may be searched for one or more expansions of the target abbreviation by invoking the contextual search query, the pseudo document index containing index of one or more pseudo documents, associated one or more abbreviations and associated context keywords. One or more pseudo documents associated with the target abbreviation may be returned based on the searching of the pseudo document index.

7 Claims, 4 Drawing Sheets

(56) References Cited

U.S. PATENT DOCUMENTS

| | | | |
|---|---|---|---|
| 7,590,606 | B1 | 9/2009 | Keller et al. |
| 7,848,918 | B2* | 12/2010 | Li et al. .............................. 704/9 |
| 2005/0086045 | A1 | 4/2005 | Murata |
| 2005/0114327 | A1 | 5/2005 | Kumamoto et al. |
| 2005/0289168 | A1 | 12/2005 | Green et al. |
| 2007/0136246 | A1 | 6/2007 | Stenchikova et al. |
| 2009/0055380 | A1* | 2/2009 | Peng et al. ......................... 707/5 |
| 2009/0192966 | A1 | 7/2009 | Horvitz et al. |
| 2009/0259629 | A1* | 10/2009 | Wei et al. ........................... 707/3 |
| 2009/0259642 | A1 | 10/2009 | Cao et al. |
| 2009/0287678 | A1 | 11/2009 | Brown et al. |
| 2009/0292687 | A1 | 11/2009 | Fan et al. |
| 2010/0100546 | A1 | 4/2010 | Kohler |
| 2011/0066587 | A1 | 3/2011 | Ferrucci et al. |

OTHER PUBLICATIONS

Jain et al. "Acronym-Expansion Recognition and Ranking on the Web", IEEE International Conference on Information Reuse and Integration, 2007.*

Roche et al. "Managing the Acronym/Expansion Identification Process for Text-Mining Applications", International Journal of Software and Informatics, 2008.*

Wang et al. "Using Wikipedia knowledge to improve text classification", Knowledge and Information Systems, 2009.*

International Search Report mailed Feb. 22, 2012 in related International Application No. PCT/US11/53062.

Mitchell, Machine Learning McGraw-Hill, 1997.

Chu-Carroll et al., "In Question-Answering, Two Heads are Better than One", HLT-NAACL'03, May-Jun. 2003, pp. 24-31, Edmonton, Canada.

Ferrucci et al., "Towards the Open Advancement of Question Answering Systems." IBM Technical Report RC24789, Computer Science, Apr. 22, 2009.

Moldovan et al., "COGEX: A Logic Prover for Question Answering." Proceedings of HLT-NAACL 2003, May-Jun. 2003, pp. 87-93, Edmonton.

Simmons, "Natural Language Question-Answering Systems: 1969." Communications of the ACM, Jan. 1970, pp. 15-30, 13(1).

Voorhees et al., "Overview of the TREC 2005 Question Answering Track." In Proceedings of the Fourteenth Text Retrieval Conference, 2005, Gaithersburg, Maryland.

Weinstein et al., Agents Swarming in Semantic Spaces to Corroborate Hypotheses, AAMAS'04, Jul. 19-23, 2004, New York, New York, USA, Copyright 2004 ACM 1-58113-864-4/04/0007.

Prager et al., "A Multi-Strategy, Multi-Question Approach to Question Answering." In New Directions in Question-Answering, Maybury, M. (Ed.), AAAI Press, 2004.

Strzalkowski et al. "Advances in Open-Domain Question-Answering," Springer, 2006 (background information only—the front cover, copyright page and table of contents only).

Balahur, "Going Beyond Traditional QA Systems: Challenges and Keys in Opinions Question Answering," Coling 2010: Poster Volume, pp. 27-35, Beijing, Aug. 2010.

Blitzer, Domain Adaptation of Natural Language Processing Systems, Presented to the Faculties of the University of Pennsylvania in Partial Fulfillment of the Requirements for the Degree of Doctor of Philosophy, 2007.

University of Illinois at Urbana-Champaign, Department of Computer Science, Research, 2010 http://cs.illinois.edu/research?report=UIUCDCS-R-2008-2974.

National Center for Biotechnology Information (NCBI), Entrez the Life Sciences Search Engine, Oct. 28, 2009.

Chang et al., "Creating An Online Dictionary of Abbreviations from MEDLINE," J Am Med Inform Assoc. 2002; 9:612-620. DOI 10.1197/jamia.M1139.

Adar, "SaRAD: a Simple and Robust Abbreviation Dictionary," Bioinformatics, Mar. 2004, pp. 527-533, vol. 20 Issue 4.

* cited by examiner

CONTEXT-BASED DISAMBIGUATION OF ACRONYMS AND ABBREVIATIONS

CROSS-REFERENCE TO RELATED APPLICATIONS

This application claims the benefit of U.S. Provisional Application No. 61/387,562, filed on Sep. 29, 2010, which is incorporated by reference herein in its entirety.

FIELD

The present application relates generally to computers, computer applications, artificial intelligence and natural language processing, and more particularly to disambiguating acronyms and/or abbreviations.

BACKGROUND

Acronyms and Abbreviations are shortened forms of words or common phrases. An abbreviation is a shortened or contracted form of a word or phrase that is used to represent the whole (e.g., Dr., for among others, "Doctor" or "Drive"). An acronym is an abbreviation formed from the initial letters of other words and sometimes pronounced as a word (e.g. IBM).

A problem understanding the intended meaning that is common to both acronyms and abbreviations is that they may have more than one, and often many, possible expansions. This results in ambiguity with respect to the actual intended expansion. Context is the backdrop by which a human reader understands the intended meaning of the expansion. For example, the acronym CIA has many possible expansions, of which two well known expansions are Central Intelligence Agency and Culinary Institute of America.

In the sentence below:
"The former CIA officer accused of revving an electric drill near the head of an imprisoned terror suspect has returned to U.S. intelligence as a contractor",
a human reader would identify that the intended expansion of the term CIA is "Central Intelligence Agency" using the context of the surrounding words for disambiguation. Here the terms "imprisoned", "terror", "suspect", "intelligence" and "officer" are relevant to this disambiguation.

In the sentence below:
"Two Certified Master Chefs from the CIA have designed and tested more than 100 kitchen essentials that meet highest professional standards in gourmet cuisine",
a human reader would identify that the intended expansion of the term CIA is "Culinary Institute of America" using the context of the surrounding words for disambiguation. Here the terms "Master Chef", "kitchen", "gourmet" and "cuisine" are relevant to this disambiguation.

An additional dimension to ambiguity is the question of whether a token in text is an abbreviation—to be expanded—or a legitimate word, which happens to have the same characters as an abbreviation. For instance "WAS" could be a word representing the past tense of "be" or an abbreviation for "Websphere Application Services". Clearly treating "WAS" as an abbreviation and expanding it appropriately again depends on the context.

For humans, the task of disambiguation is most often simple, straightforward and natural. On the other hand, automated computer systems have a great deal of difficulty in extracting the intended meaning of Acronyms and Abbreviations during the process of Natural Language Processing (NLP). This problem is particularly exacerbated when the NLP task is performed in open and broad domains as opposed to narrow domains of discourse because the number of alternative interpretations is very large.

BRIEF SUMMARY

A method and system for context-based disambiguation of acronyms and/or abbreviations may be provided. The method in one aspect may include determining a target abbreviation and one or more keywords appearing in context with the target abbreviation. The target abbreviation represents a shortened form of one or more words. The method may also include generating a contextual search query including the target abbreviation and the one or more keywords that occur in the abbreviation context. The method may further include searching a pseudo document index for one or more expansions of the target abbreviation by invoking the contextual search query. The pseudo document index contains index of one or more pseudo documents, associated one or more abbreviations and associated context keywords. The method may further include returning one or more target pseudo documents associated with the target abbreviation based on the searching of the pseudo document index. The method may further include providing one or more expansions associated with the target abbreviation based on the returned one or more target pseudo documents.

A method for context-based disambiguation of acronyms and/or abbreviations, in another aspect, may include generating an abbreviation expansion dictionary by identifying a set of acronyms and abbreviations with associated potential expansions. The method may further include generating a pseudo document for each expansion identified in the abbreviation expansion dictionary. The pseudo document may include an abbreviation, associated expansion and one or more words and/or sentences that occur with said abbreviation. The method may also include generating a pseudo document index indexing the abbreviation, the associated expansion and one or more words and/or sentences that occur in the context of said abbreviation.

A system for context-based disambiguation of acronyms and/or abbreviations, in one aspect, may include an analyze passage module operable to execute on a processor and further operable to determine a target abbreviation and one or more keywords appearing in context with the target abbreviation in a received passage, the target abbreviation representing a shortened form of one or more word. The system may also include a contextual search query generation component operable to generate a contextual search query including the target abbreviation and said one or more keywords. The system may further include a search pseudo document index module operable to search a pseudo document index for one or more expansions of the target abbreviation by invoking the contextual search query. The pseudo document index may contain an index of one or more pseudo documents, associated one or more abbreviations and associated context keywords. The search pseudo document index module may be further operable to return one or more pseudo documents associated with the target abbreviation based on the searching of the pseudo document index. One or more expansions associated with the target abbreviation may be provided based on the returned one or more target pseudo documents.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A Natural Language Processing (NLP) System should be able to handle Acronyms and Abbreviations, for example, by proper identification of an Acronym or Abbreviation token in text and the proper expansion, where appropriate. In one aspect of the present disclosure, ranking and scoring the possible alternative Acronym or Abbreviation expansions based on the context (for example, lexical, syntactic, and/or semantic) of the text that they occur are disclosed. This ranking and scoring allows a NLP system to consider alternative hypotheses based on probabilistic metrics and to perform significantly better in "understanding" the intended meaning of the natural language text.

A methodology in one embodiment of the present disclosure may "curate" or generate documents, referred to herein as Pseudo Documents (PS) or Title Oriented Documents (TOD), that aggregate passages related to a particular contextual use of an expansion. Each Pseudo Document has an associate Title which is the expansion. Pseudo Documents may be indexed (e.g., Search Index) using the terms of the contextually relevant passages that the documents contain.

A search query may be generated that contains terms that co-occur with the Acronym or Abbreviation that is being disambiguated, and run against a Pseudo Document Search Index. Based on these terms matching the specific context of a curated Pseudo Document, a hit list of possible expansions that have an associated rank and score may be returned.

In one embodiment of the present disclosure, a methodology may 1) Generate a Dictionary of Acronyms and Abbreviations with their associated expansions; 2) Generate a corpus of Pseudo Documents whose titles are specific expansions and whose text body contains a broad set of passages that capture the broad set of terms that are often part of this expansions common usage; 3) Generate a Search Index that can be queried with relevant contextual terms and that will return the appropriate Pseudo Document whose title is a likely expansion; 4) Generate an automated system that can reliably recognize tokens that are Acronyms and Abbreviations; 5) Generate a Contextual Search Query using the context in which a target Acronym or Abbreviation occurs; 6) Generate a ranked and scored list of possible expansions that can be used in subsequent processing. In another aspect, a Natural Language Understanding System may be built that embodies the above approach.

Figure 1:
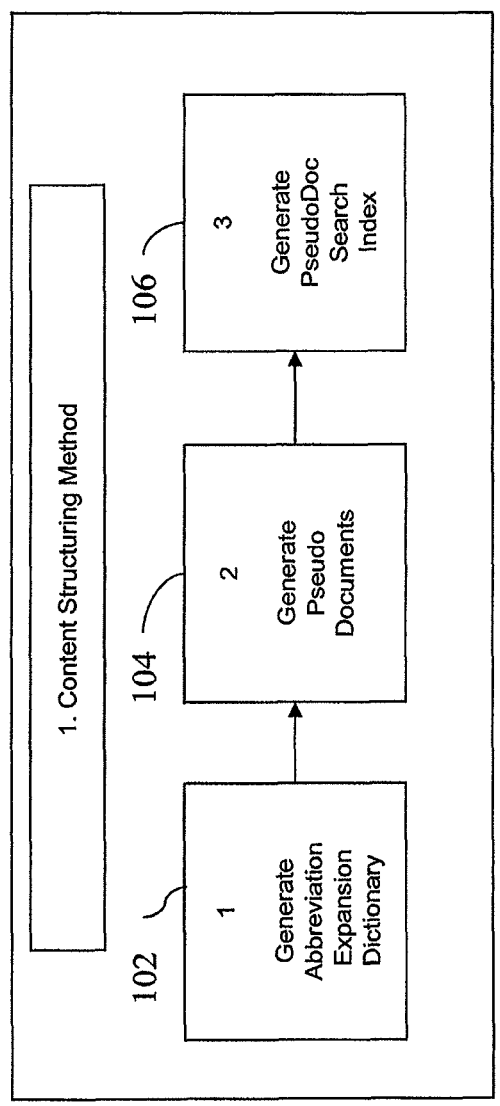
FIG. 1 illustrates a process of content structuring in one embodiment of the present disclosure.

A process referred to in this disclosure as content structuring may allow extracting and curating a set of documents that can be used to identify potential expansions. FIG. 1 illustrates a process of content structuring in one embodiment of the present disclosure.

At 102, an abbreviation expansion dictionary is generated. The generating of the abbreviation expansion dictionary may include identify a comprehensive set of Acronyms and Abbreviations along with their associated potential expansions. This process can take advantage of a large body of curated content from existing database of resources, e.g., those available online or otherwise, that have abbreviation resources.

At 104, pseudo documents may be generated. For instance, a pseudo document may be generated for each expansion in the abbreviation expansion dictionary, for example, generated at 102. The generating of the pseudo documents may generate a set of Pseudo Documents for each expansion of an Acronym or Abbreviation by crawling the web or extracting text (words) from sources that contain language commonly occurring with the target expansion. In one embodiment, these Pseudo Documents may also contain a structured field containing the Acronym or Abbreviation, which may be used as a parameter to a search query to filter or return only potentially possible documents (e.g., those that are expansions of the target Acronym or Abbreviation). An example of a Pseudo Document follows.

```
<Pseudo Document>
    <Abbreviation expansion>: Culinary Institute of
    America</Abbreviation expansions>:
    :
    <Abbreviation> CIA </Abbreviation>
    <passage> The Culinary Institute of America in New York and
California offer food industry courses and training in cooking, baking,
pastry, wine and food service. </passage>
    <passage> If your goal is to enter the food service industry as a baker
or pastry chef, this program will provide extensive knowledge and
experience. The CIA's 21-month program develops competency in baking
bread, preparing desserts, confections, pâtisserie and pastry. You'll
also learn basic cooking skills and food safety, as well as how to write
a menu and cost controls.</passage>
    <passage> Take academic courses such as Food Safety, Nutrition,
Culinary Math, Introduction to Gastronomy</passage>
    </Pseudo Document>
```

At 106, Pseudo Documents Search Index may be generated. Generating the Pseudo Documents Search Index may generate a search index that can be used to retrieve relevant candidate expansions by a target query that contains keywords extracted from the context of the target Acronym or Abbreviation. For instance, the keywords in the target query may be matched against the terms stored in the Pseudo Documents Search Index. For example, the search index may include an inverted index, and/or forward index. Other types of index may be built. An example of an inverted index may store a list of pseudo documents associated with each word. An example of a forward index may store a list of words associated with each document.

Figure 2:
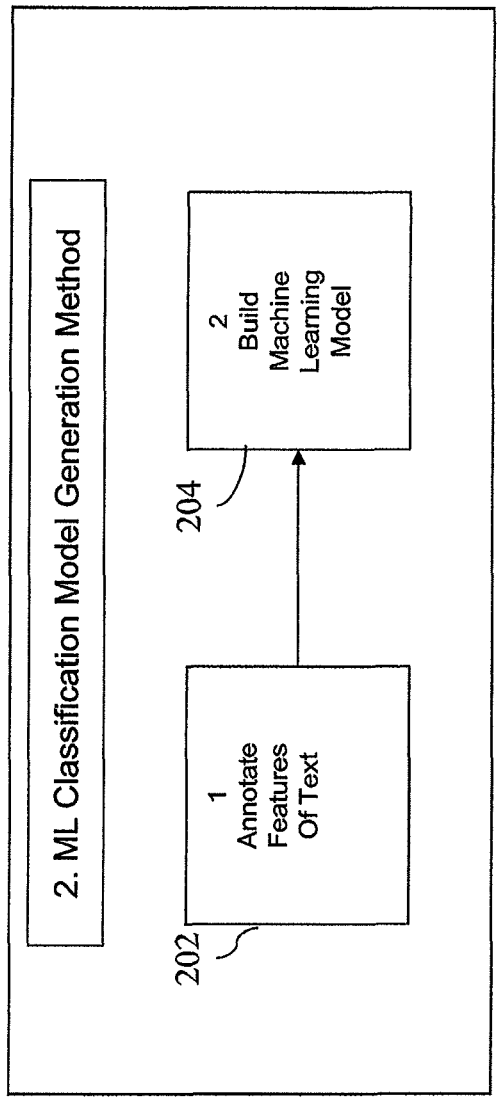
FIG. 2 illustrates machine learning classification model generation in one embodiment of the present disclosure.

FIG. 2 illustrates machine learning classification model generation in one embodiment of the present disclosure. The machine learning classification model generation stage in one embodiment results in a model that is utilized in the contextual disambiguation process discussed below to detect Acronyms and Abbreviations that occur, e.g., in text. This component uses a set of features and machine learning techniques to generate a model to this end. This model may be built once and can be used to identify acronyms and abbreviations in any body of text. Text can be a natural language question or passage, of any text in a document.

In one embodiment of the present disclosure, feature generation 202 may be driven by a mix of rule-based patterns which capture both lexical and syntactic properties of the context. Machine learning then may optimally combine those with the rest of the semantic context to build a model 204 capable of distinguishing when a token represents an abbreviation to be expanded (during text analysis) or to be associated with its full form (e.g., during Pseudo Document generation). Tokens, for example, refer to the "words" in a sentence in a text; features refer to attributes associated with the text, e.g., mathematical entities extracted or determined from analyzing the "text" and other metadata relevant to the document or related to the text. Machine Learning by Tom M. Mitchell, McGraw-Hill, 1997, describes techniques in machine learning and feature generation.

Figure 3:
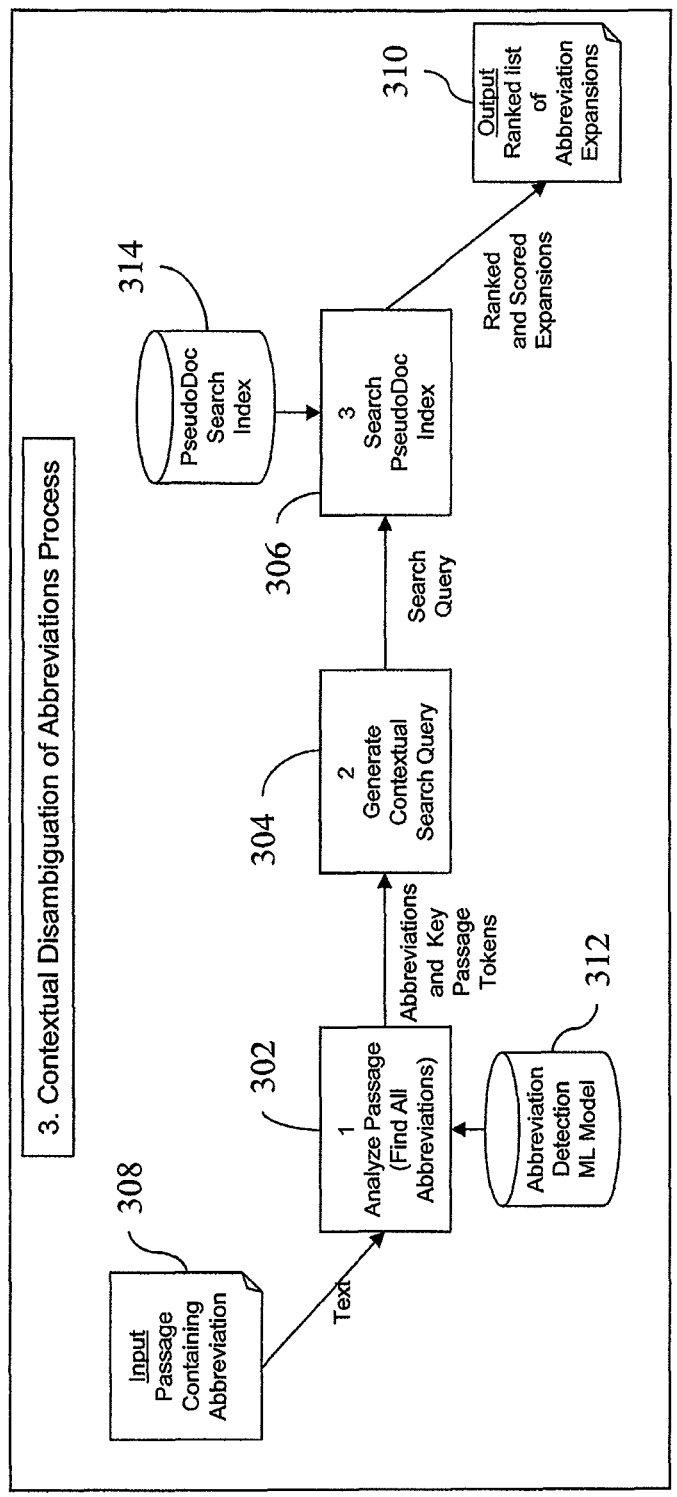
FIG. 3 illustrates a contextual disambiguation process in one embodiment of the present disclosure.

FIG. 3 illustrates a contextual disambiguation process in one embodiment of the present disclosure. The contextual disambiguation process in one embodiment may act as the glue that ties together all the components described above into a coherent process/system that identifies Acronyms and Abbreviations, and, for instance, returns a ranked and scored list of possible expansions.

An Analyze Passage component 302 in one embodiment may employ a mix of rule-based patterns to generate the features (e.g., FIG. 2 at 202) that are used by the Machine Learning model (e.g., FIG. 2 at 204) to detect Acronyms and Abbreviation and identify tokens relevant to contextual disambiguation (such as "imprisoned", "terror", "suspect", "intelligence" and "officer" in the example above) that will be used in query generation at 304. In one embodiment of the present disclosure, definition of features and analytics to extract these features, and the resulting Machine Learning model may be built, and used (e.g., in subsequent text analysis or question answering requests) to identify abbreviations that occur in text that is analyzed by the code that embodies the Machine Learning componentry. In one embodiment of the present disclosure, features may be extracted for every piece of text that is being analyzed (e.g., to identify abbreviations) and they comprise the information that is used by the Machine Learning model in the classification process.

For example, the analyze passage component 302 may receive a passage text 308 to analyze as input. The passage text 308 may contain text description of a topic. The analyze passage component 302 parses the passage text 308 to determine acronyms and/or abbreviations that need to be expanded. The analyze passage component 302 may also retrieve from the passage text 308 one or more keywords used in the context of the acronyms and/or abbreviations. The analyze passage component 302 may do this by employing the machine learning model and annotated features of text shown in FIG. 2. For instance, an abbreviation on detection component 312 may embody the Machine Learning componentry that extracts features from the incoming text and detect abbreviations and annotations within it.

A Generate Contextual Search Query component 304 may be responsible for generating a query in a form that can be used by a search engine to retrieve the relevant documents. Here the Acronym or Abbreviation (also referred to as a target acronym or abbreviation) can be given as a parameter to the search query to retain only documents that are legal expansions of the target, which documents also contain the contextually relevant keywords. An example of a query is shown below. A query may include the target abbreviation and contextual words or terms associated with the target abbreviation. Query: [(TargetAbbreviation: CIA) (Disambiguating Terms: cooking, baking, pastry, wine, food service)]

For instance, the generate contextual search query component 304 may receive from the analyze passage component 302 one or more acronyms and/or abbreviations and one or more keywords (also referred to as tokens) appearing in the context of the acronyms and/or abbreviations. In one embodiment of the present disclosure, these keywords are derived from the passage that contains the abbreviation that is the target of disambiguation, i.e., whose expansion is being determined. Using the received input, the generate contextual search query component 304 generates a search query.

A Search PseudoDoc Index component 306 may be responsible for issuing the query to a Search Engine that has pre-loaded the Pseudo Document Index 314, e.g., generated at 106 in FIG. 1. The query outputs one or more expansions to the target acronym or abbreviation 310 based on the returned pseudo documents. Each expansion is a possible candidate expansion for the current (target) abbreviation sought for expansion. For example, if CIA is the target abbreviation, then possible expansions may be "Culinary Institute of America", "Central Intelligence Agency", and/or other. In one embodiment of the present disclosure, the possible candidate expansions returned from the query may be ranked, e.g., in the order of document that contain terms that most closely matching the search terms. The ranking may be computed by a search engine that performs the search. Each expansion in the ranked hit list also may have an associated score that is used to measure the strength of the match, e.g., representing the "strength" or "confidence" that the item retrieved matches the query. The search engine used to perform the search in response to the query may also compute such scores and return the results together with the possible candidate expansions.

Each of the components or modules (e.g., analyze passage component 302, Generate Contextual Search Query component 304, Search PseudoDoc Index component 306) may run or execute on one or more processors or cores, whether on a single processing platform or in a distributed computing manner. Interactions and communications between and among the components may be performed locally and/or remotely via a network. Similarly, repositories of abbreviations 312 and pseudo documents and/or pseudo document index 314 may be storage devices storing data, and may reside locally and/or remotely to the one or more processors running the components The methodologies described herein may be utilized in question answering (QA) systems such as those described in U.S. patent application Ser. No. 12/152,411 and U.S. patent application Ser. No. 12/126,642, which are incorporated herein by reference in their entirety. Question answering systems generally utilize natural language processing, machine learning and/or data mining and other technologies to process the questions and produce answers, for example with confidence level or score that measures the accuracy or correctness of the produced answers. For example, the abbreviation expansion techniques of the present disclosure may be utilized to expand one or more abbreviations occurring in a question in order to more accurately interpret the context of the question and thus be able to provide more accurate answer. The methodologies described herein however is not limited to only that usage. For example, the techniques may be used to expand abbreviations found in any natural language text or documents or the like data.

Figure 4:
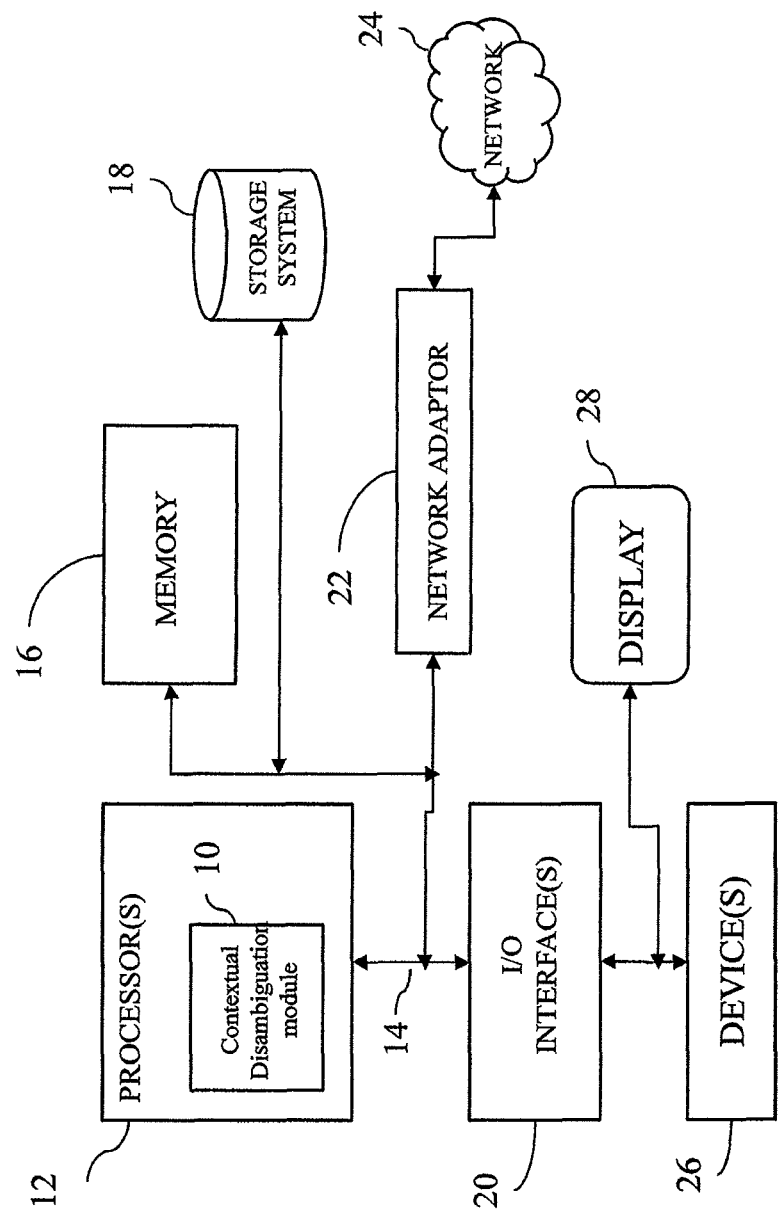
FIG. 4 illustrates a schematic of an example computer or processing system that may implement the context-based disambiguation of acronyms and abbreviations in one embodiment of the present disclosure.

FIG. 4 illustrates a schematic of an example computer or processing system that may implement the context-based disambiguation of acronyms and abbreviations, for instance, as described above, in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a context-based disambiguation module 10 that performs the context-based disambiguation described herein. The context-based disambiguation module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for context-based disambiguation of abbreviations, comprising:

determining a target abbreviation and one or more keywords appearing in context with the target abbreviation in a received passage, the target abbreviation representing a shortened form of one or more words;

generating automatically by a processor, a contextual search query comprising the target abbreviation and said one or more keywords;

searching, by the processor, a pseudo document index for one or more expansions of the target abbreviation by invoking the contextual search query, the pseudo document index containing index of one or more pseudo documents by titles, associated one or more abbreviations, and associated context keywords, wherein the titles are the expansions of the abbreviations contained in the pseudo documents respectively;

returning one or more target pseudo documents associated with the target abbreviation based on the searching of the pseudo document index; and providing one or more expansions associated with the target abbreviation based on the returned one or more target pseudo documents, wherein the determining the target abbreviation and one or more keywords appearing in context with the target abbreviation in a received passage comprises generating one or more features that capture lexical and syntactic properties of the passage, and recognizing said target abbreviation and said one or more keywords appearing in context with the target abbreviation in the received passage based on the captured lexical and syntactic properties.

2. The method of claim 1, wherein said one or more pseudo documents are built to include a name containing an expansion of an abbreviation and content containing the abbreviation and associated context keywords.

3. The method of claim 1, further including generating a ranked list or scored list or combination of both, of the returned one or more target pseudo documents associated with the target abbreviation.

4. The method of claim 1, wherein the target abbreviation includes an acronym.

5. The method of claim 1, wherein the one or more pseudo documents are built based on a dictionary of abbreviations and associated expansions.

6. The method of claim 1, wherein a pseudo document of said one or more pseudo documents is generated for an expansion in an abbreviation expansion dictionary, by extracting data from sources that contain language occurring with the expansion.

7. A method for context-based disambiguation of abbreviations, comprising:

generating an abbreviation expansion dictionary by identifying a set of abbreviations with associated potential expansions;

generating, by a processor, a pseudo document for each expansion identified in the abbreviation expansion dictionary, the pseudo document comprising an abbreviation, associated expansion and one or more words that occur with said abbreviation, the generated pseudo document having a title corresponding to the associated expansion of the abbreviation that the pseudo document contains, the pseudo document generated at least by extracting data from sources that contain language commonly occurring with the expansion;

generating a pseudo document index indexing said abbreviation and said associated expansion; and generating a machine learning classification model by generating one or more features that capture lexical and syntactic properties of a received passage, and building the machine learning classification model for recognizing one or more target abbreviations and one or more target keywords appearing in context with the target abbreviation in the received passage.

* * * * *